United States Patent

[11] 3,617,910

[72] Inventor Odo J. Struger
Milwaukee, Wis.

[21] Appl. No. 25,069
[22] Filed Apr. 2, 1970
[45] Patented Nov. 2, 1971

[73] Assignee Allen-Bradley Company
Milwaukee, Wis.

[54] PHASE AND AMPLITUDE DETECTORS
7 Claims, 2 Drawing Figs.

[52] U.S. Cl. .......................................................... 329/166,
307/235, 307/240, 307/321, 329/135, 332/47
[51] Int. Cl. .......................................................... H03d 5/00
[50] Field of Search .......................................................... 329/166,
165, 164, 135; 307/235, 240, 241, 242, 321;
330/9; 332/43 B, 44, 47

[56] References Cited

UNITED STATES PATENTS

| | | | |
|---|---|---|---|
| 2,562,912 | 8/1951 | Hawley | 329/166 X |
| 2,579,524 | 12/1951 | Terry et al. | 332/43 B X |
| 3,029,386 | 4/1962 | Ricker | 307/321 X |
| 3,193,773 | 7/1965 | Uglum et al. | 329/166 X |
| 3,205,457 | 9/1965 | Bell | 332/44 |

*Primary Examiner*—Alfred L. Brody
*Attorneys*—Thomas O. Kloehn and Arthur H. Seidel

ABSTRACT: In both half-wave and full-wave detectors a 2 kHz., squared reference signal is imposed on DC terminals on one side of a pair of diode gates, and, inverted, on DC terminals on an opposite side of a pair of diode gates. A 2 kHz. input signal is connected to one AC terminal of both diode gates. The other AC terminals of the diode gates are connected to the input terminals of an inverting operational amplifier on the output terminal which the detector output signal appears. In the half-wave detector, the diode gates are uniformly oriented with respect to the reference signal and the AC terminals of the diode gates are both connected directly to the inverting input terminal of the operational amplifier. In the full-wave embodiment, the diode gates are oppositely oriented with respect to the reference signal and one of the diode gates has its AC terminal connected to the noninverting input terminals of the operational amplifier while the other diode gate has its AC terminal connected to the inverting input terminal of the operational amplifier.

INVENTOR
ODO J. STRUGER

BY [signature]

ATTORNEY

INVENTOR
ODO J. STRUGER
BY Thomas O. Kloehn
ATTORNEY

PHASE AND AMPLITUDE DETECTORS

BACKGROUND OF THE INVENTION

The detector of the present invention was created for use in a numerical control system for a machine tool. Such a control system requires a feedback loop reflecting the actual position of the machine tool member being controlled and the first step in such a loop is a transducer to translate the mechanical movement of the machine into electrical signals. In this instance, a resolver driven by rotating member on the machine is used as the transducer and the output from the resolver is a 2 kHz. carrier signal that is amplitude modulated by the machine movement such that if the field of the resolver is energized with fixed amplitude carrier signals, the resolver output will be a sign wave envelope modulated carrier signal with the phase of the carrier signal reversing each time the envelope passes through zero. The phase of the output signal can manifest directional movement and the amplitude and phase can measure the amount of movement.

Hence, a detector is needed that can detect the amplitude of the carrier signal, and that can detect the phase of carrier signal. A DC output signal is needed. The amplitude of the DC output should be a function of the amplitude of the carrier signal and the polarity of the DC output should be a function of the phase of the carrier signal. Such a DC signal would have a wave form closely analogous to the envelope of the modulated carrier.

SUMMARY OF THE INVENTION

The present invention relates to the signal detector capable of detecting both the amplitude and phase of a periodically varying input signal. More specifically the invention resides in the combination of a pair of gate circuits that are responsive to a reference signal, that have one set of control terminals connected to receive a reference signal and other set of control terminals connected through an inverter to receive an inverted reference signal, that have input gate terminals connected to receive and input signal of the same frequency as the reference signal, and that have output gate terminals connected to a summing device which is adapted to sum the signals from the two output gate terminals to produce a detector output signal.

A detector embodying the above-described invention is capable of detecting both phase and amplitude of the input signal and providing an output signal the amplitude of which is proportional to the amplitude of the input signal and the polarity of which is proportional to the phase relationship of the input signal to the reference signal. A circuit embodying the above described invention may be a static, solid-state device which is compact, light weight, economical to purchase and operate and which is versatile and reliable. The detector embodying the present invention is capable of maintaining a significant isolation of the signal to be detected from the reference signal and manifests a high degree of immunity from the effects of noise, both in reference signal and in the input signal. Also a detector embodying the present invention is capable of extremely high-speed operation and hence is readily adapted to function precisely and reliably throughout a broad range of frequencies.

DESCRIPTION OF THE PREFERRED EMBODIMENT

Figure 1:
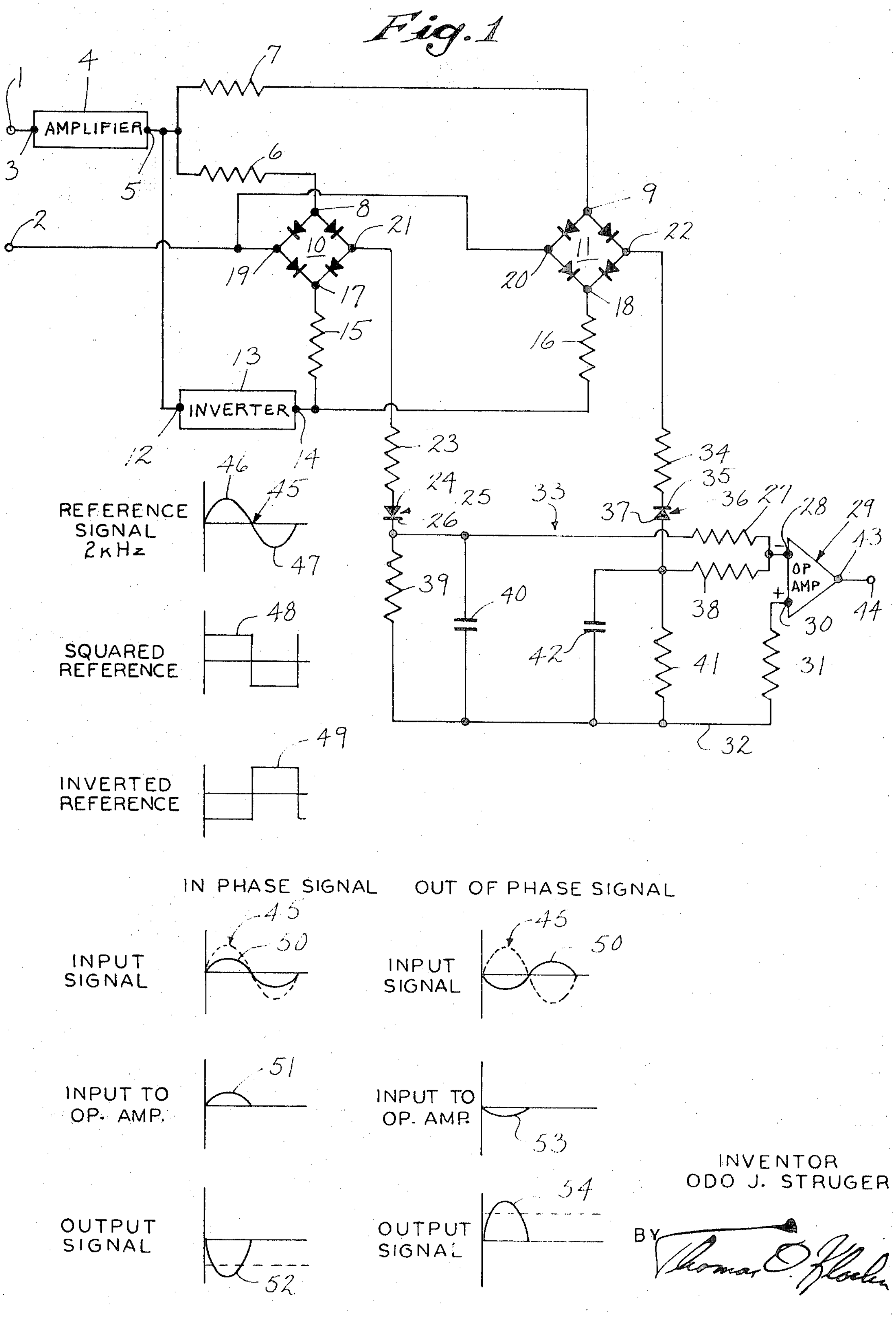
FIG. 1 is a schematic diagram of a half-wave detector embodying the present invention, with nine labeled signal graphs including a graph of a 2 kHz. reference signal imposed on the referenced terminal of the diagram, another graph of the reference signal as squared by the amplifier and imposed on a bias terminal of the first gate circuit, a graph of the inverted reference signal as imposed on the biased terminal of the second diode gate, a graph of the input signal as compared with a broken line representation of the reference signal, a graph of the input to the inverting terminal of the output amplifier when the input signal and reference signal are in phase, an output signal appearing at the output of the output amplifier when the input signal and the reference signal are in phase, the input signal as compared with a broken line representation of the reference signal when the input signal and the reference signal are out of phase, the input into the inverting terminal of the output operational amplifier when the input signal and the reference signal are out of phase, and the output of the detector circuit when the input signal and the reference signal are out of phase.

The half-wave detector shown in FIG. 1 has a reference signal terminal 1 and an input signal terminal 2, both of which appear on the left-hand side of the drawing. The reference signal terminal 1 is connected to an input terminal 3 of an amplifier 4. An output terminal 5 of the amplifier 4 is connected through resistors 6 and 7, respectively, to positive control terminals 8 and 9 of respective diode gate circuits 10 and 11. The output terminal 5 of the amplifier 4 is also connected to an input 12 of an inverter 13, and output terminal 14 of which is connected through respective resistor 15 and 16 to negative control terminals 17 and 18, respectively, of the diode gate circuits 10 and 11. Hence when a positive signal appears at the positive control terminals 8 and 9 of the diode gate circuits 10 and 11, a negative signal will appear at the negative control terminals 17 and 18, respectively, and the diode gate circuits 10 and 11 will be forward biased, or "on." If a negative signal appears on the positive control terminals 8 and 9 of the respective diode circuits 10 and 11, a positive signal will appear at the negative control terminals 17 and 18, respectively, and the diode gate circuits 10 and 11 will be reverse biased, or "off."

The input signal terminal 2 is connected in common to input gate terminals 19 and 20 of the diode gate circuits 10 and 11. Opposite the input gate terminals 19 and 20, respective diode gate circuits 10 and 11 are output gate terminals 21 and 22. The output gate terminal 21 of one of the output gate circuits 10 is connected through a balancing resistor 23 to an anode 24 of a positive, or in-phase, conducting diode 25, the cathode 26 of which is connected through a coupling resistor 27 to an inverting input terminal 28 of an output operational amplifier 29. A noninverting input terminal 30 of the output operational amplifier 29 is connected through a resistor 31 to a common base line 32 of low-pass filter network 33. The output gate terminal 22 of the other diode gate circuit 11 is connected through a balancing resistor 34 to a cathode 35 of a negative, or out-of-phase conducting diode 36, an anode 37 of which is connected through a coupling resistor 38 to the inverting input terminal 28 of the output operational amplifier 29. The low-pass filter network 33 is really two filters, one of which is made up of a filter resistor 39 connected in parallel with a filter capacitor 40 from the cathode 26 of the positive diode 25 to the common base line 32, and the other of which consists of a second filter resistor 41 and filter capacitor 42 connected parallel between the anode 37 of the negative conducting diode 36 and the common base line 32.

The output operational amplifier 29 has an output terminal 43 which is connected to an output terminal 44 of the detector. Being an operational amplifier 29, when a positive signal appears at the inverting input terminal 28, a negative output signal appears at the output terminal 43, and when a negative signal appears at the inverting input terminal 28, a positive output signal appears at the output terminal 43 of the output operational amplifier 29. By contrast, if a positive signal appears at the noninverting input terminal 30 of the operational amplifier 29 a positive output signal will ll appear on the output terminal 43, and if a negative signal appears at the noninverting input terminal 30, a negative output signal will appear at the output terminal 43 of the operational amplifier 29.

The operation of the half-wave detector is more readily visualized in terms of the signal shapes appearing at various points in the circuit. A 2 kHz. reference signal 45, which is a sign wave with a positive half-cycle 46 and a negative half-cycle 47, is imposed on the reference signal terminal 1 and the input terminal 3 of the amplifier 4. This signal drives the amplifier 4 to saturation so that an alternating square wave 48 appears at the output terminal 5 of the amplifier 4 and is transmitted to the positive control terminals 8 and 9 of the diode gate circuits 10 and 11, respectively. The square wave 48 is also transmitted to the input terminal 12 of the inverter 13, where it is inverted, so that an inverted reference signal 49 appears at the output terminal 14 of the inverter 13 and is transmitted to the negative control terminals 17 and 18, respectively, of the diode gate circuits 10 and 11. By inverting the squared reference signal 48 to produce the inverted squared reference signal 49 and applying the squared reference signal 48 to one pair of control terminals, either 8 and 9 or 17 and 18, and applying the inverted reference signal 49 to the other pair of control terminals 17 and 18 or 8 and 9, all four diodes in each gate 10 and 11 will be either reverse biased or forward biased simultaneously. The input signal terminal 2 also sees a sign wave input signal 50, which is a 2 kHz. signal and which may be either in or out of phase with the reference signal 45 depending upon the direction of rotation and cycle of the resolver rotor (not shown). When the input signal 50 and the reference signal 45 are in phase, a positive half-cycle of the input signal 50 is transmitted through a positive conducting diode 25 to the inverting input terminal 28 of the output operational amplifier 29, producing an amplified negative output signal 52 at the output terminal 43 of the output operational amplifier 29 and thus at the output terminal 44 of the detector. When the input signal 50 goes out of phase with the reference signal 45, the negative half-cycle 53 is connected by the diode gate circuits 10 and 11, but the positive conducting diode 25 blocks it while the negative conducting diode 36 passes it to the inverting input terminal 28 of the output operational amplifier 29. Consequently, an amplifier positive output signal 54 appears at the output terminal 43 of the output operational amplifier 29, and thus at the output terminal 44 detector. Hence, so long as the input signal 50 and the reference signal 45 are in phase the output operational amplifier 29 will produce negative output signals 52 at alternate half-cycles, and when the input signal 50 is out of phase with the reference signal 45, the output operational amplifier 29 will generate an amplified positive output signal 54 at alternate half-cycles.

Figure 2:
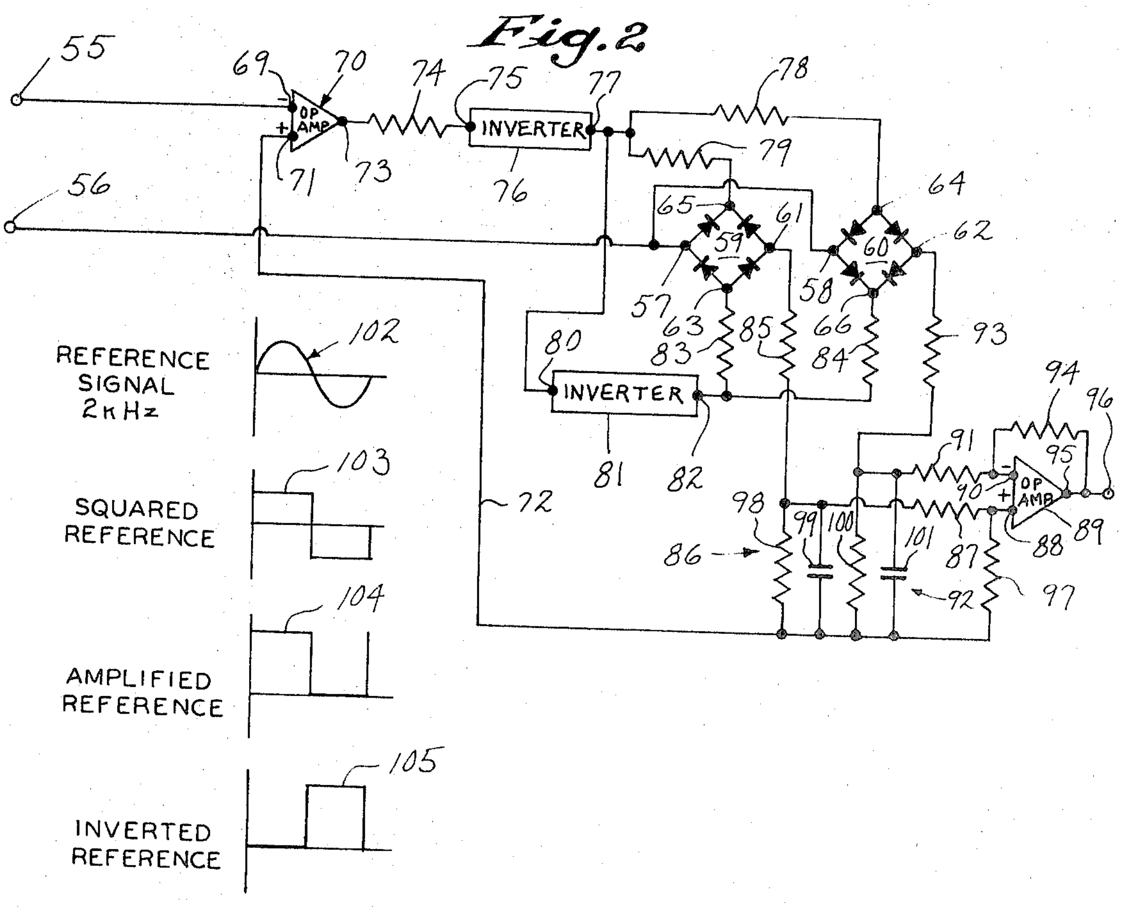
FIG. 2 is a schematic diagram of a full-wave detector embodying the present invention, with 12 labeled graphical representations of signals in the circuit including graphs of the 2 kHz. reference signal imposed on the reference terminal, the 2 kHz. reference signal as squared by the referenced signal amplifier and as appearing at the output of the amplifier, the amplified reference signal as imposed on the bias terminals of the circuit, the inverted amplified reference signal as imposed on the other bias terminals of the gate circuits, the input signal as compared with a broken line representation of the reference signal when the two are in phase, the signal on the inverting input of the output operational amplifier when the input and reference signals are in phase, the signal of the noninverting input of the output operational amplifier when the input and reference signals are in phase, the output of the operational amplifier when the input and reference signals are in phase, the input signal when it is out of phase with the reference signal represented in broken lines, the signal on the inverting input terminal of the output operational amplifier when the input and reference signals are out of phase, the signal on the noninverting terminal of the output operational amplifier when the reference signal and input are out of phase, and the output signal of the output operational amplifier when the reference input signals are out of phase.
Figure 2:
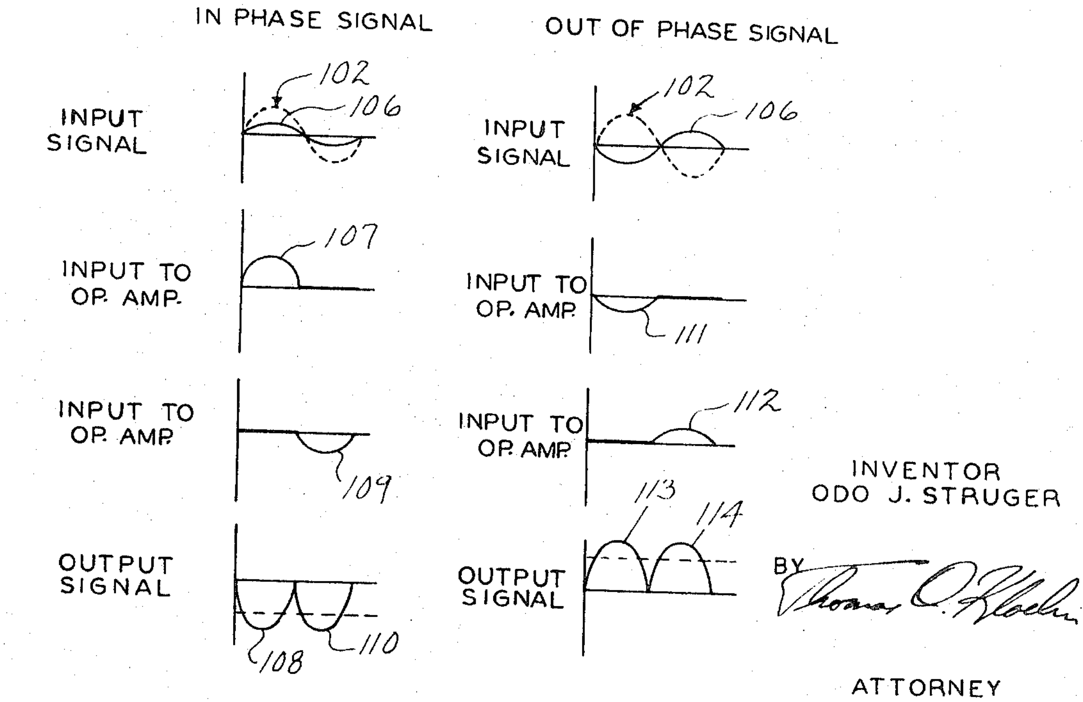

For faster response, the full-wave embodiment of the invention illustrated in FIG. 2 is superior. As with the first embodiment, the full-wave detector has a reference signal terminal 55 and an input signal terminal 56, and the input signal terminal is connected to input gate terminals 57 and 58 of respective diode gates 59 and 60. The diode gates 59 and 60 also have output gate terminals 61 and 62, respectively, positive control terminals 63 and 64, respectively and negative control terminals 65 and 66.

The reference signal terminal 55 is connected to an inverting input terminal 69 of an operational amplifier 70, which has its noninverting input terminal 71 connected to a common base line 72. The inverting operational amplifier 70 has its output terminal 73 connected through a resistor 74 to an input terminal 75 of an inverter 76, which is also an amplifier.

The amplifier inverter 76 has an output terminal 77 which is connected through a resistor 78 to the negative control terminal 64 of the diode gate circuit 59, through a resistor 79 to the positive control terminal 65 of the diode gate circuit 60, and to an input terminal 80 of another inverter amplifier 81. The second inverter 81 has an output terminal 82 which is connected through one resistor 83 to the positive control terminal 63 of the diode gate 59 and through a second resistor 84 to the negative control terminal 66 of the other diode gate 60. The first diode gate 59 has its output gate terminal 61 connected through a balancing resistor 85, a low-pass filter network 86 and a coupling resistor 87 to a noninverting input terminal 88 of an output operational amplifier 89. The output operational amplifier 89 has an inverting input terminal 90 connected through a coupling resistor 91, a second low-pass filter network 92 and a balancing resistor 93 to the output gate terminal 62 of the second diode gate 60. A gain control resistor 94 is connected from an output terminal 95 of the output operational amplifier 89 to the inverting input terminal 90. And the output terminal 95 is also connected to an output terminal 96 of the detector. The noninverting input terminal 88 of the output operational amplifier 89 is connected through a resistor 97 to the common base lines 72. The first low-pass filter net work is made up of a filter resistor 98 and filter capacitor 99 connected in series with the balancing resistor 85 to the output gate terminal 61 of the first diode gate 59, and the second low-pass filter network 92 is made up of a parallel connected filter resistor 100 and filter capacitor 101 connected in series with the balancing resistor 93 to the output gate terminals 62 of the second diode gate 60.

The operation of the full-wave detector may be visualized in terms of the signal forms appearing at various points in the circuit. The reference signal terminal 55 receives a 2 kHz. reference signal 102 which is a sine wave, and the reference signal amplifier 70, operating at saturation, produces a square wave reference signal 103 at its output terminal 73. This square wave reference 103 is fed to the input terminal of 75 of the inverter amplifier 76 which raises it above the zero reference point and amplifies it to produce a square wave signal 104 which is transmitted to the negative control terminal 65 of the diode gate 59 and the positive control terminal 64 of the other diode gate 60. The output terminal 77 of the inverter amplifier 76 is also connected to the input terminal 80 of the inverter amplifier 81 which inverts the amplified square wave to provide an inverted reference 105 which is transmitted to the positive control terminal 63 of the first diode gate 59 and to the negative control terminal 66 of the second diode gate 60.

The input signal terminal 56 of the full-wave detector sees a sine wave input signal 106 which is the same frequency as the reference signal 102 and which may either be in phase or out of phase with the reference signal 102. When the input signal 106 is in phase with the reference signal 102, a positive half-wave 107 appears at the inverting input terminal 90 of the output operational amplifier 89, resulting in an amplified negative half-wave output signal 108 at the output terminal 95 of the output operational amplifier 89. In the next half cycle, a negative half-wave 109 appears at the noninverting input terminal 88 of the operational amplifier 89 with the result that a second amplified negative half-wave output signal 110 appears at the output terminal 95. When the input signal 106 is out of phase with the reference signal 102 the reverse occurs. When the input signal 106 goes negative, a negative half-cycle 111 appears at the inverting input terminal 90 of the operational amplifier 89 and when the input signal 106 swings positive, a positive half- cycle 112 appear at the noninverting terminal 88 with the total result that two successive amplified positive half-wave output signals 112 and 113 appear at the output terminal 95 of the output operational amplifier 89 hence at the output terminal 96 of the full-wave detector.

Those signal forms referred to in the preceding paragraph are both generated and transmitted by the full-wave detector in the following manner. When the reference signal 102 on the reference input terminal 55 swings positive at the inverting input terminal 69 of the saturated operational amplifier 70, a negative square half-cycle appears at the output terminal 73 of the amplifier 70 and this is inverted by the inverter amplifier 76 and raised above the zero reference to produce a positive pulse at the output terminals 77 of the inverter amplifier 76 to reverse bias the first diode gate 59 and forward bias the second diode gate 60. This positive pulse is inverted by the second inverter 81 with a result that a negative pulse appears at the positive control terminal 63 of the first diode gate 59 and a negative signal appears at the negative control terminal 66 of the second diode gate 60. Thus the first diode gate 59 is turned off and the second diode gate 60 is turned on, conducting the input signal to the inverting input terminal 90 of the output operational amplifier 89 and blocking the input signal from the noninverting input terminal 88 of the output operational amplifier 89. In the half-cycle of input signal 106 conducted to the inverting input terminal 90 is negative, then the output of the output operational amplifier will be positive, and conversely if the half-cycle of the input signal 106 conducted to the inverting input terminal 90 of the output operational amplifier 89 then the output from the output operational amplifier 89 will be negative. In the next half-cycle the first diode gate 59 will be forward biased to conduct the the noninverting input terminal 88 while the second diode gate 60 will be reverse biased to block the inverting input terminal 90 from the input signal terminal 56. Consequently, if the first half-wave of the input signal 106 was positive producing a negative output from the output operational amplifier 89 then the next half-cycle will be negative and conducted by the first diode 59 to the noninverting input terminal 88 to produce a second negative going output pulse. Conversely if the first half-cycle was negative, the next half-cycle will be positive and conducted by the first diode gate 59 to the noninverting input terminal 88 to produce a second positive output pulse at the output terminal 95 of the output operational amplifier 89. Thus, the output of the operational amplifier 89 appearing at the detector output terminal 96 will be negative when the input signal 106 is in phase with the reference signal 102 and will be positive when the input signal 106 is out of phase with the reference signal 102.

The diode gate circuits 10 and 11 (in the half-wave detector) and 59 and 60 (in the full-wave detector) may be considered identical, and all four are full-wave bridges 10, 11, 59 and 60. Conventionally, such diode bridges are employed as full-wave rectifiers, the input signal being fed to the AC terminal (here referred to as gating terminal 19–22 and 57, 58, 61 and 62) with the desired, full-wave rectified DC taken out of the DC terminals (here referred to as control terminals 8, 9, 17, 18, 63–66). To utilize the diode bridges 10, 11 59 and 60 as gate circuits, a control or bias signal is imposed on the control terminals (DC terminals) to back bias or forward bias the diodes in the bridges 10, 11, 59 and 60 with the result that the bridges 10, 11, 59 and 60 either block or conduct a signal (in this case an AC signal, input to the gate terminals 19, 20, 57 and 58). To operate as a gate, it is essential, therefore, that the reference signals 45 and 102 have a greater amplitude than the input signals 50 and 106 to be controlled, or else the input signals would override the bias signal and forward bias the diodes. Also, the diode gate could be connected in parallel between the input and output instead of in series between the input and output; in the former situation alternately shunting out or passing the input signal, and in the latter alternately blocking or passing the input signal. Diode gates have a number of advantages and chief among them are the sharp on-off characteristic of their operation and their high-speed response which allows virtually limitless frequency to be controlled by them. Diode gates are extraordinarily versatile in that they can control either alternating or unidirectional signal, they can be highly sensitive, reliable and stable.

The output operational amplifiers 29 and 89 of the two embodiments function differently in one respect, but they are identical in their function as summing devices in both embodiments. In both embodiments the amplification capability of the operational amplifiers 29 and 89 is essential to the specific practical intended use. However, the amplification is not essential to the invention in its broadest sense. In the first embodiment the inverting capability of the output operational amplifier 29 is incidental to the circuit and not necessary to the essential function of the detector; that is to say, the half-wave detector would detect both input signal amplitude and end phase changes as well without the inverting function as with it. However, in the second embodiment the uniformly negative or positive polarities of the output signals from the operational amplifier 89 can only be achieved through the inverting function of the operational amplifier 89 in the absence of some other circuit modification. An appreciation of the operation of this detector may be aided by emphasizing the input signals detected and diagrammed in the drawings are the carrier signals having a frequency of 2 kHz. and these carrier signals are amplitude modulated at a frequency in the range of 60 to 90 Hz. so that what may appear as a constant amplitude in the graphs shown in the drawings is really but one of the series of amplitudes which vary as a sign wave function. The output signals from the output operational amplifiers 29 and 89 will vary in magnitude functionally with the amplitudes of the input signals 50 and 106.

The forgoing is a description of the invention, and of the manner and process of making and using it, in such full, clear, concise, and exact terms as to enable any person skilled in the art to which it pertains, or with which it is most nearly connected, to make and use the same through a detailed description of the best mode presently contemplated by the inventor for carrying out his invention. However, by contrast with the specific embodiment shown here, the subject matter which the inventor regards as his invention is particularly pointed out and distinctly claimed in the claims that follow.

I claim:

1. A detector for detecting phase and amplitude of an input signal, the detector comprising the combination of
   a pair of gate circuits, each of said gate circuits having first and second control terminals and gate input and output terminals;
   said first control terminals of said pair of gate circuits being connected to receive a reference signal;
   said second control terminals of said pair of gate circuits being connected through an inverter to receive said reference signal inverted;
   said gate input terminals of said pair of gate circuits being connected to receive an input signal;
   and summing means connected to said output gate terminals of said gate circuits to provide an output signal functional of a sum of said input signals to said input gate terminals.

2. A detector for detecting phase amplitude of an input signal as set forth in claim 1 wherein
   the gate circuits are diode bridge gate circuits.

3. A detector for detecting phase and amplitude of an input signal as set forth in claim 2 wherein
   said first control terminals of said pair of gate circuits are positive control terminals and second control terminals of said diode gate circuits are negative control terminals.

4. A detector for detecting phase and amplitude of an input signal as set forth in claim 2 wherein
   said first control terminal is a positive control terminal of one of said pair of diode gate circuits and a negative control terminal of the other of said pair of diode gate circuits, and said second control terminal is a negative control terminal of said one diode gates and a positive control terminal of the other of said pair of diode gates.

5. A detector for detecting phase and amplitude of an input signal as set forth in claim 4 wherein said summing means is an inverting operational amplifier having an inverting input terminal connected to a gate output terminal of one of said pair of diode gate circuits and noninverting input terminal connected to the gage output terminal of the other of said pair of diode gate circuits.

6. A detector for detecting phase and amplitude of an input signal as set forth in claim 3 wherein said summing means is connected through a positive-conducting diode to the output gate terminal of one of said pair of gate circuits and through a negative-conducting diode to the output gate terminal of the other of said pair of diode gate circuits.

7. A detector for detecting phase and amplitude of an input signal as set forth in claim 1 wherein said reference signal is an AC signal of fixed frequency and phase, and said input signal is an AC signal of said fixed frequency with varying phase relationship to said reference signal and varying amplitude.

* * * * *